No. 696,171. Patented Mar. 25, 1902.
R. H. HASSLER.
SECONDARY BATTERY.
(Application filed Dec. 10, 1900.)
(No Model.)
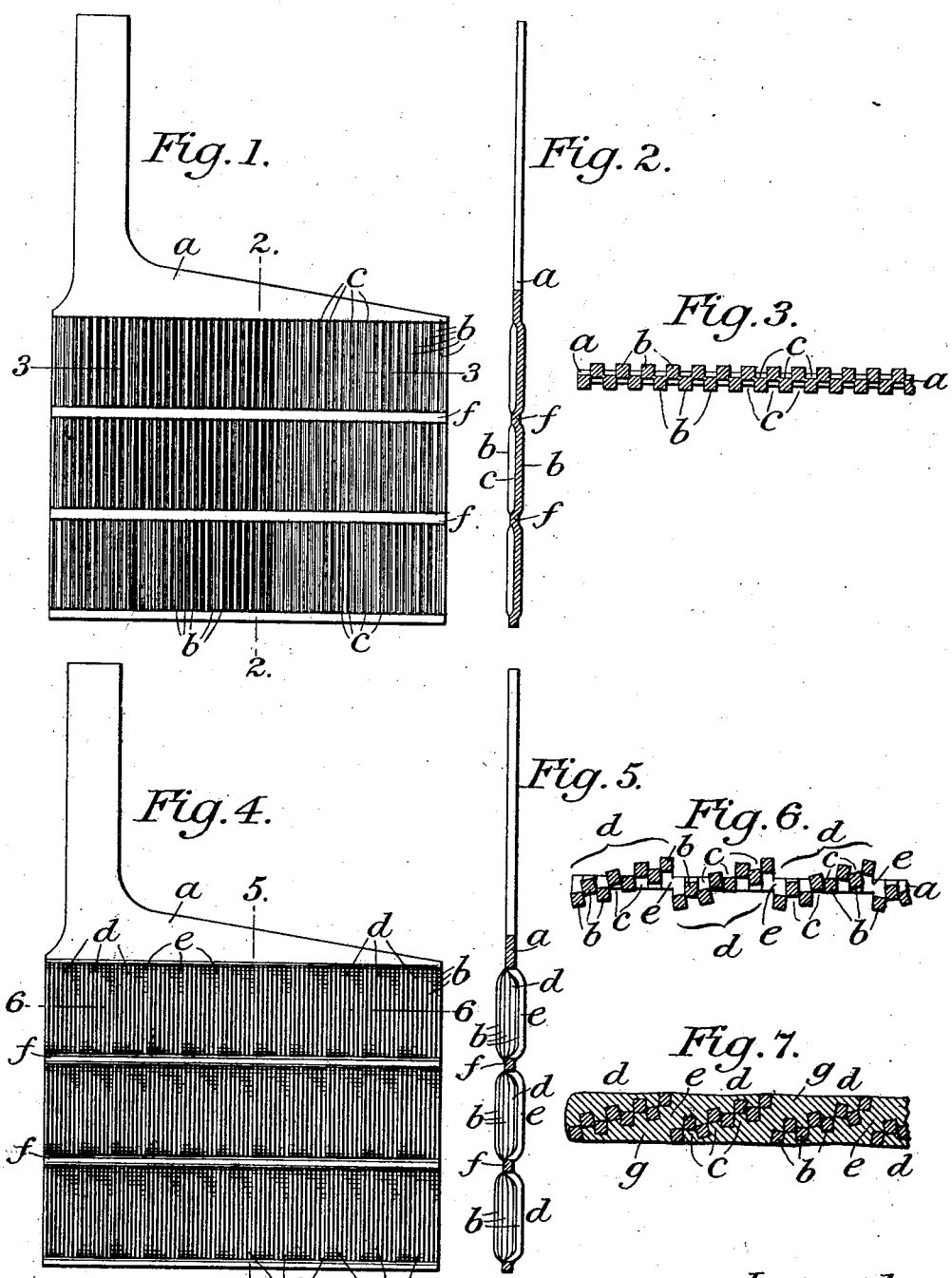

UNITED STATES PATENT OFFICE.

ROBERT H. HASSLER, OF INDIANAPOLIS, INDIANA, ASSIGNOR TO NATIONAL BATTERY COMPANY, OF JERSEY CITY, NEW JERSEY, AND CLEVELAND, OHIO, A CORPORATION OF NEW JERSEY.

SECONDARY BATTERY.

SPECIFICATION forming part of Letters Patent No. 696,171, dated March 25, 1902.

Application filed December 10, 1900. Serial No. 39,318. (No model.)

*To all whom it may concern:*

Be it known that I, ROBERT H. HASSLER, a citizen of the United States, residing in the city of Indianapolis, in the State of Indiana, have invented certain new and useful Improvements in Secondary Batteries, of which the following is a specification, reference being had to the accompanying drawings, forming a part hereof.

This invention relates particularly to the plates or grids to which is applied the active material, and has for its object to reduce weight, increase the capacity, prolong the effective life, and decrease the cost of production of secondary-battery plates. In accordance with the invention the plate of metal, lead, or grid previous to the application of the active material thereto is given such a shape or configuration as to afford a large surface of contact for the active material and to retain the same securely in position when applied, while at the same time the necessary mechanical strength is retained.

The invention will be more fully described hereinafter with reference to the accompanying drawings, in which—

Figure 1 is a side view of a plate or sheet of metal after subjection to the first step in the formation of the improved grid. Fig. 2 is a section on the plane indicated by the broken line 2 2 of Fig. 1. Fig. 3 is a section on the plane indicated by the line 3 3 of Fig. 2. Fig. 4 is a view of the completed grid. Fig. 5 is a section on the plane indicated on the line 5 5 of Fig. 4. Fig. 6 is a section on the plane indicated by the line 6 6 of Fig. 4. Fig. 7 is a view similar to Fig. 6, but showing the active material applied to the grid.

The plate or sheet $a$ of metal is first subjected to the action of rollers or any other suitable mechanism whereby small alternating ribs $b$ and grooves $c$ are formed, the ribs and grooves being staggered on opposite sides of the plate. In this operation the ribs on opposite sides are preferably not separated along their edges, but remain connected, as clearly shown in Fig. 3, the plate thus being in effect finely corrugated, although by reason of the nature of the metal and as a matter of preference in order to secure a better union with the active material the ribs and grooves are substantially rectangular.

The finely-corrugated sheet of metal above described is next subjected to the action of other mechanism, preferably in the nature of a punch-press, whereby the smaller ribs $b$ or primary corrugations are struck up or upset in groups $d$ to form larger or secondary corrugations. Each group is entirely separated along its edge from the next group, so that a space or opening $e$ is formed between adjacent groups, one edge of each group being struck toward one side of the plate and the other edge of the same group being struck toward the other side of the plate, as clearly shown in detail in Fig. 6.

It will be understood that in practice the ribs, both primary and secondary, are relatively short, not extending entirely across the plate, but being arranged in series which are separated by bands $f$.

When the grid has been prepared in the manner above described, the active material represented at $g$ in Fig. 7 is pressed into the grid and baked or otherwise treated in the usual manner. By reason of the peculiar formation of the grid, particularly the separation along their edges of the several groups of smaller ribs or corrugations, the active material is securely keyed or dovetailed in the grid. The fact that the units of active material on opposite sides of the plate are united to each other through the openings between the groups insures the retention of these units firmly in position. At the same time the joining of the smaller ribs along their edges preserves the mechanical strength of the plate, so that the application of the paste or active material is accomplished much more easily and the finished product is much less susceptible to the disintegrating influence of the Planté action when the battery is in use.

I claim as my invention—

1. A grid for secondary batteries having a series of groups of primary ribs and grooves or corrugations, the edges of each group being struck in opposite directions whereby each group is separated from the next along its edge, substantially as shown and described.

2. A plate for secondary batteries comprising a grid and active material, the grid having a series of groups of primary ribs and grooves or corrugations, the edges of each group being struck in opposite directions, whereby adjacent groups are separated along their edges forming openings, and the units of active material on opposite sides of the plate being united to each other through the openings between adjacent groups, substantially as shown and described.

This specification signed and witnessed this 27th day of November, A. D. 1900.

ROBERT H. HASSLER.

In presence of—
CHAS. L. PEPPER,
MARK C. O'CONNOR.